United States Patent Office 3,219,461
Patented Nov. 23, 1965

3,219,461
PROCESS FOR PARTIALLY DEHYDRATING, IMPREGNATING AND FREEZING FOOD PRODUCTS
Frank G. Lamb, Lake Oswego, Oreg., assignor to Lamb-Weston, Inc., Weston, Oreg., a corporation of Oregon
No Drawing. Filed July 17, 1964, Ser. No. 383,490
10 Claims. (Cl. 99—192)

This is a continuation-in-part of application Serial No. 50,589, filed August 19, 1960, and now abandoned. This invention relates to a process for the partial dehydration and freezing of food products, and more particularly, to a process of this type wherein the freezing is accomplished at pressures much below atmospheric. Also, utilization of a vacuum to partially dehydrate and simultaneously freeze the given food product enables subsequent impregnation into the substance of the food product certain desired additives, which may be added for such purposes as preservation of cellular structure of the involved food, appearance, taste, increased shelf life when frozen, etc.

Various dehydration procedures are known to the art. Methods for lowering the temperature of food products which involve the use of relatively low pressures are also known. However, in the instant invention, my concept is inclusive of a practically simultaneous dehydration, impregnation, and freezing procedure, wherein the use of relatively high vacuum accomplishes all such steps in one simplified method.

Dehydration as spoken of in the foregoing is intended to mean dehydration only to a partial extent, and not to that extent which would prohibit full reconstitution of the food product so treated. In the instant case the frozen product is not dehydrated more than about from 15% to 20%. In other words, it is preferred that dehydration not exceed that point where more than about 20% by weight of moisture is removed from the given product.

The instant invention is propounded as one which not only attains a three-step desideratum in one stage, but as one, which, by recognizing that vacuum treatment will achieve adequate flash freezing while at the same time enable rapid and efficient impregnation of any added substance into such food product, results in economies not heretofore attained in previous processes. The latter have required separate, often highly complex, and different and unrelated stages of dehydration and freezing, without appreciation of the significance of impregnation during or simultaneously with, such steps.

It is accordingly a primary object of the invention to provide a process wherein a given food product is partially dehydrated by the application of a relatively high vacuum thereto, and simultaneously, due to the latent heat of vaporization in the juices of the food, the latter is sufficiently cooled to and well below the freeze point in a relatively short period of time.

Another object of the invention is to provide a process of the described type wherein, prior to release of the vacuum to which the food products is subjected, the product is immersed in the impregnating solution or the impregnating solution is caused to flow over the product within the vacuum chamber. Such solution, upon release of the vacuum within the vacuum chamber, is induced to impregnate the interior of such product. In this respect the impregnating solution may be of almost any type, inclusive of, but not confined to, sweetening agents such as invert sugar, preservatives of various types such as calcium sulfate, vitamins of various types, and other substances which enhance the taste, appearance, and quality of the given product when it is subjected to thawing, room temperature prior to immediate consumption.

A further object of the invention is to provide a process of this type wherein the three steps of partial dehydration, freezing, and impregnation are all attained or directly dependent upon the application of a substantially high vacuum to the product; utilization of the vacuum principle in obtaining these objectives thereby providing a process which is economical to the extreme and which, compared to other processes known to the art which are more complex, extremely simplified in operation.

Another object of the invention is the provision of a process for the treatment of food products which is applicable to almost any type of vegetable or fruit such as for example, strawberries, grapes, pears, carrots, etc. In this respect, the novel process steps described herein are also applicable to the treatment of meats which, by the practice of this invention, can be prepared for sale in the frozen state as partially dehydrated foods.

In its essential steps the novel procedure of the instant invention may be summarized as follows: the reduction in pressure in the atmosphere surrounding the product being treated to remove moisture therefrom and cool the same, the rate of pressure reduction being such as to effectuate the formation of channels in the product through which moisture may escape during dehydration of the product and through which the impregnating solution may enter the product, the rate of pressure reduction being not so great as to cause excessive cell damage by rupture thereof, quick freezing by imposition of a relatively high vacuum after the product has reached the freezing point, such vacuum during the freezing step accomplishing the partial dehydration of the involved food product to not more than about 20% moisture removal, impregnation by subjection of the product to an impregnating solution prior to or during the course of or subsequent to vacuum freezing procedure; subsequent impregnation by increase of pressure concurrent with or followed by additional cooling; and finally, refreezing, if this be necessary, to a degree to assure preservation of the product during periods of shelf life and until actually consumed by the buyer.

The rate at which the pressure is reduced upon a product will vary depending upon the product. In most cases, it is undesirable to reduce the pressure so rapidly as to cause excessive cell rupture by "blowing up" the cells as a result of excessive pressure differential across the cell wall. On the other hand, the pressure reduction should be rapid enough to cause the formation of channels or passageways through the product. Such channels not only facilitate the escape of moisture but also facilitate the impregnation of the product with the impregnating solution. In the instance of a soft, fragile product like strawberries, the pressure reduction should occur over a period of about three to five minutes to attain the above results. Firmer products, such as, for example, meat and carrots, may undergo substantially instantaneous pressure reduction without deleterious cell damage. The desired rates for other individual products may easily be determined by testing.

In the preferred embodiments of the invention the pressure utilized for freezing is, as stated above, relatively low. Such vacuum, dependent upon the material being treated, may range from about 150 micron pressure to about 4500 micron pressure (expressed differently, such range may be recited as between from about .15 mm. of mercury to about 4.5 mm. of mercury). Even the highest pressure of this range (4500) is sufficient to sharp or quick freeze most edible food products. Such freezing is considered to involve that physical phenomenon wherein the latent heat of vaporization removed from the food product and used in evaporating the juices or liquids therefrom is sufficent to cool the same to the freeze point or below. Vacuum treatment as a flash freeze method has another inherent value: during such evacuation phase oxidizing gases are removed from the food product. This in turn tends to prevent deterioration of the product over extended periods of storage. Such is particularly true when the evacuated interstices or pores of the food are filled, in the practice of this process, with a liquid additive containing a preservative, such as some well known and selected anti-oxidant.

In the preferred practice of the invention particularly where such solutions as are utilized to impregnate the given food product have a relatively high melting point, the same are admitted to the vacuum chamber after the pressure therein has been raised to a value slightly above the vapor pressure of such solution at its freezing temperature. In the event that the chamber pressure is to be raised rapidly after entry of the fluid, impregnation may be hastened by admitting the impregnant when the chamber pressure is slightly below the vapor pressure of the impregnant. This is because at relatively low pressure or at pressures substantially below that of the boiling vapor pressure of such solution, admission of the latter to the vacuum chamber may cause the solution to immediately flash and boil causing the solution to splatter over the interior of the entire chamber. Chamber pressures slightly below the boiling vapor pressure of the impregnant may be tolerated, providing, however, that the heat removed from this solution in the form of latent heat of vaporization, and supplied to evaporate a portion of this liquid, is insufficient to freeze same or impair its ease of impregnation. Additionally, and more significantly, such solution will tend to vaporize and freeze before contacting the involved food product. Hence, the pressure within the vacuum chamber cannot be so low as to promote flash vaporization and consequent freezing of the involved solution used for impregnation.

Mechanisms for inducing required vacuum conditions in a suitable vacuum vessel are well known. The same is true of a means whereby an impregnating solution can be admitted to the vacuum chamber to be poured over the product within the chamber. For example, the impregnating solution can be maintained in a flask or container separate from the vacuum chamber, such flask having a feed-in line from the main source of supply of the impregnating solution and an exit line leading to the vacuum chamber. The latter vacuum line may contain mounted therein a refrigerated trap for removing and recovering the vaporized impregnant. A three-way valve connecting the main feed-in line with the flask and a three-way valve connecting the exit line with the vacuum chamber are themselves interconnected through such three-way valves. A pressure release valve may be located in the line directly feeding the impregnating solution into the container for same. In the operation of such apparatus as this, the feed-in to the chamber is closed by the appropriate three-way valve and pressure lowered to the desired degree within the chamber. When it is desired to admit the impregnating solution to the chamber and to flow it over the product contained therein, presuming the solution container to be charged with the impregnating solution, the three-way valve to the vacuum chamber is opened to the solution flask. By opening the pressure release valve in the feed-in line to the solution container, vacuum within the vacuum chamber causes the fluid within the flask to enter into such chamber, its entry being controlled and regulated by such pressure release valve. Such systems, as stated, are well known and the one described in the foregoing merely exemplary.

By "flash" or "quick" freezing, as herein used, is meant the freezing of a given product with sufficient rapidity to prevent the formation of large ice crystals and to promote, in the freezing procedure, the development of only relatively small ice crystals, so that the cells of the food product being treated are not subject to rupture and hence, despite the rather substantial amount of moisture removal, may be readily reconstituted upon defreezing prior to consumption.

With respect to this freezing operation carried out under conditions of relatively high vacuum, it is also to be understood that such represents an initial freezing, i.e., freezing prior to conditioning or treatment of the food product with some preservative or taste additive; subsequent freezing in the preferred process, i.e., freezing preparatory to storage, may be by any conventional method so long as a temperature of from about 10° F. to about 0° F. is maintained, this also being sufficient for indefinite storage of the food from a preservative standpoint.

Compared to processes of the prior art, seeking dehydrated frozen food products which have the ability to fully reconstitute, the instant invention is representative of a process that is inordinately short and quick. For example, evacuation time during the initial freeze of the vacuum vessel will not exceed more than about three to five minutes, and in from about eight to fifteen minutes the product is subjected to a vacuum sufficiently high to accomplish the freezing step. Conditioning or impregnation by the chosen additive is also quickly performed, for impregnation is accomplished over a period of time which may be measured in minutes, and is achieved by gradual release of the vacuum, the consequent increased pressure forcing the fluid additive into the various interstices and pores of the food product being treated. In the preferred practice of the invention, the variables of chamber pressure, time of impregnation, and viscosity of the impregnant, are selected with respect to the particular food being processed so as to control and limit the quantity of fluid impregnant returned to the food product. In order to achieve a full degree of reconstitution after storage of the treated and frozen food product, it has been found necessary to limit the amount of impregnant retained in the food prior to freezing such that the combined weight of retained moisture after the initial dehydration plus the weight of impregnant constitutes less than 90 weight percent of the fluids initially present in the food. In this respect, the desired flavoring, preservation or quality improving properties of the impregnant will impart the result sought to a food having approximately 20 percent by weight of the moisture removed when the quantity of liquid impregnant lies between 5 to 10 percent by weight of the fluids present in the untreated food prior to freezing; or, in equivalent terms, from between 25 to 50 percent by weight of the moisture, removed by dehydration, is replaced with impregnant. Accordingly, all of the prefreezing, dehydration, conditioning and final freezing phases of the above inventive process can be accomplished in less than a full hour. Subsequent freezing is also preferably of the flash-freezing type but can be accomplished by any known method whereby the treated product is subjected to temperature within the range given above.

Furthermore, by such vacuum treatment, dehydration is accomplished evenly throughout the mass of the product. Application of vacuum in the described manner permits of even distribution of the additive which is to be impregnated into the product, and accomplishes impregnation throughout the entire mass thereof. The vacuum treatment of the instant process has further significant advantages: such vacuum-impregnation procedure precludes the tendency of most food products to "case harden" during dehydration; also, by such, water vapor channels are automatically formed throughout the mass. The latter facilitate both further dehydration as well as further impregnation, should such be desired.

The conditioning step whereby certain additives are forced into the body of the food product (due to the release of vacuum and consequent increased pressure upon the food substance) contemplates the addition of, for example, ingredients to flavor or better the taste of the frozen product. Hence, a solution of invert sugar can be utilized to increase the sugar content of such fruits as strawberries and grapes. Again, certain preservatives may be added to the fruit or vegetable (by the same increase in pressure step due to vacuum release) and these may involve such additives as a mixture of calcium chloride and ascorbic acid or a mixture of calcium chloride and sulfur dioxide. In addition, certain fruits or vegetables may have imparted to them increased vitamin value by the addition of known solutions of high vitamin content, selectively chosen as to the type of particular vitamin desired.

It is also important to note that in the application of the process to the partial dehydration and freezing of meats certain known tenderizers (involving enzymatic components) can be prepared in solution form, admitted to the vacuum chamber and caused to impregnate the meat product after vacuum freezing by release of vacuum and increase in pressure in the manner mentioned above. In addition, meats may be impregnated with certain liquid fats or solutions of liquid fats, which tend to "marble" the same.

Generally speaking, the additive, as indicated, is in a liquid form and admitted to the vacuum chamber containing the food product to be treated in an amount sufficient to achieve adequate penetration. The amount may be critical inasmuch as after conditioning with the additive, i.e., after release of the vacuum, the consequent sudden increase of pressure causes the additive to be pressed into the food substance. The cells of the food, now containing a liquid impregnant, may be ruptured upon refreezing by expansion of the water therein due to the shift from the liquid to solid phase. Accordingly, and since water is known to expand upon freezing to approximately 10% of its original volume, it is generally preferred to initially remove at least 10% of the moisture originally present prior to refreezing and to replace any additional amount removed over and above this 10% with the liquid impregnant. The initial vacuum evaporation thus removes about 10 to 20 weight percent of the moisture before the liquid remaining therein is frozen.

Although the exact mechanism of such impregnation procedure, with reference to the distribution of the fluid, is unknown, it is theorized that the individual cells under the conditions herein employed are not entirely refilled with impregnant. This is based in large part on the difference between the driving forces used in impregnating and dehydrating, i.e. the pressure differential between the internal cell pressure and chamber pressure. It may be further explainable on the theory that water transmission across the cell membrane is not a truly reversible process but requires a greater osmotic pressure for refilling than dehydration and, as a consequence, the fluid impregnant tends to remain within the interstices formed by the cells themselves.

An alternative procedure may be preferred in dealing with certain food products. This procedure involves reheating of the product after freezing and partial dehydration consequent upon application of relatively low pressure. Such reheating functions to accomplish greater moisture removal from the product being treated and will insure removal to about 20% of the initial moisture. Such reheating step can be conducted at least once and perhaps several times, depending upon the nature of the particular food product being treated, and in each instance may be followed by refreezing under conditions of low pressure. Such reheating may be accomplished by the admission of warm air at e.g., 120° F., to the vacuum chamber (after evacuation thereof) for a period of time sufficient to raise the product to room or ambient temperature; that is, from about 60° F. to 100° F. In the practice of the instant process impregnation may optionally follow the last vacuum freezing step, and thus, dependent upon the type of food product being treated, it is possible to go through several stages of refreezing and reheating before final application of vacuum and impregnation by a suitable solution consequent upon release of this low pressure.

In other words, the basic sequence of steps in this alternate embodiment of the invention are as follows: subjection to flash freezing by vacuum; releasing the vacuum and heating by application of hot air or other means to the product in the chamber, thereby further dehydrating such product; refreezing by vacuum; raising the pressure of the vacuum chamber to a point permitting admission of the impregnating solution without freezing of the latter; gradually releasing the vacuum to increase pressure to atmospheric thereby impregnating the product with the said solution; draining off excess solution; and finally refreezing by either the vacuum procedure or by conventional methods preparatory to final freeze storage.

In this cycle of operation the amount of dehydration accomplished with inclusion of the reheating phase is significant, functioning to attain the 15% to 20% moisture removal mentioned in the foregoing.

Food products treated in accordance with the inventive steps of this process exhibited a superior quality in every respect as measured by ordinary consumer standards. Such products, in addition to having a shelf life (when frozen) of indefinite duration, easily and quickly reconstitute or, if reconstitution is not involved in view of the relatively small amount of moisture which has been removed therefrom, exhibit proper qualities of taste or even exhibit an improved taste due to impregnation by suitable reagents. In addition, and particularly with respect to meat products which have been subjected to enzymatic treatment by impregnation during the vacuum release stage, foods so treated exhibit a greater degree of tenderness than meat products which are fresh or consumed without having been subjected to freeze storage. In other words, and particularly with respect to meat products, the conditioning step enabling impregnation throughout the meat substance of active enzymatic reagents, renders the same more tender than the initial product prior to the treatment herein contemplated.

The following examples of the practice of the invention are illustrative only and not to be considered as confined to the precise food products herein referred to. In other words, the process is applicable without restriction to almost any type of food product, particularly those which have a porous exterior and therefore more readily lend themselves to penetration by a selected additive during the conditioning phase. Some foods, such as grapes, must have the skins thereof punctured, as is indicated with respect to Example II, infra.

*Example I*

One pound of good quality strawberries were capped, washed and superficially dried. They were then placed in an open container, and positioned in a suitable vacuum chamber at room temperature, in this instance, 75° F. the order of vacuum in the vacuum zone was in the range of from 200 to 500 microns of mercury (.2 to .5 mm. of mercury). In order to observe temperature gradients thermocouples were so arranged as to pierce several of the strawberries in the middle of the mass thereof, to enable ready determination of internal temperatures obtained by application of high vacuum.

The vacuum chamber was then immediately evacuated to the extent indicated and after six minutes the thermocople instrument gave a reading of 15° F., or substantially below freezing. After nine minutes the temperature in the interior of the berries was —10° F. A mercury pressure gauge, used in conjunction with the vacuum chamber to determine degree of vacuum, indicated the pressure within the chamber to be 260 microns (0.26 mm.) of mercury. The amount of moisture reduction in the strawberries at this point was determined to be about 18%.

At this point, the pressure within the chamber was raised to 4500 microns (4.5 mm. of mercury) to permit addition of the selected additive. A 50% solution of invert sugar was then poured over the berries. This was accomplished through mechanical means known to the art as described above, and of course, without completely breaking the vacuum. The temperature of the invert sugar solution, when applied to the berries, was 54° F.

The pump was permitted to operate for another two minutes then turned off to permit pressure within the vacuum chamber to return to room pressures.

The excess sugar solution was drained from the berries and the latter refrozen by conventional means and then placed in cold storage under a constant temperature of about −10° F. The period of storage was approximately three months.

The berries were then removed, subjected to room temperature and, when thawed, exhibited all of the natural qualities of the same food product as originally picked. The same were firm, and, due to sugar penetration which sweetened the product throughout the entire mass thereof, exhibited a taste even better than the original berries.

The above experiment was repeated using all sliced berries, the results being that the slices exhibited the same firmness of texture and excellence of color and taste, although it was noted that, as expected, more of the additive drained from the sliced product after subjected to room temperature.

It was further observed, with respect to experiments relating to both the whole as well as sliced strawberries, that whereas the strawberries which were used in these experiments when they were fresh had white centers, those processed by the instant method exhibited a pleasing pink center or interior. This was a clear demonstration that during the evacuation process, water and air are removed from the entire mass of the food product, and that later, during the impregnation phase, the sugar solution was forced completely through the berry, carrying with it some of the flavor and pigment from the outer portions of the berry to the inner portions thereof.

*Example II*

Approximately one pound of green seedless grapes were washed and pricked to puncture the skin. These were placed in an appropriate container and positioned in the vacuum chamber at room temperature.

The vacuum pump was activated and after nine minutes, the gauge pressure was indicated to be 4500 microns (4.5 mm.) of mercury. After this same period of time the temperature inside the grapes, as determined by an appropriate thermocouple instrument penetrating the same, had been reduced to 31.5° F. At this temperature reading a 50% Brix solution of invert sugar, diluted with ascorbic in a concentration of 0.88 gram per 400 ml. was poured over the grapes. The pump was deactivated and pressure increased to atmospheric. The grapes were removed, excess syrup drained off, and the food product placed in cold storage at a temperature of approximately −10° F.

After storage for a period of approximately three months the grapes were thawed by subjection to room temperature and again exhibited qualities comparable to the original, as picked.

*Example III*

The vacuum procedure as described with respect to Example I was employed, only this time using carrots as the specimen food product.

The carrots were first scraped and blanched in steam for five minutes. Following blanching, the temperature of the carrots was determined to be 113° F., at which temperature they were admitted to the vacuum chamber. In subjecting the product to a vacuum of about 500 microns of mercury pressure (.5 mm. of mercury), it was determined that the temperature through usual thermocouple arrangement, and after a period of twelve minutes, had been reduced to 31° F.

The carrots were then subjected to a brine solution (while in partial vacuum), such solution comprising the following formulation: an aqueous solution of 0.5 gram of calcium chloride, 0.25 gram of citric acid, 5.0 grams of sucrose and 500 ml. of water.

The vacuum was released following the pouring of such solution over the food product, the releasing procedure occupying the period of time of about five minutes, or consisting of a gradual release of vacuum with a gradual increase of pressure.

The excess fluid was then drained off and the carrots subjected to refreezing, by a conventional method, to −10° F., and placed in permanent frozen storage.

The food product was stored for a period of three months then thawed by subjection to room temperature and cooked in the usual manner. This food product exhibited all of the normal characteristics of flavor, taste, etc., as the original raw product. It was found that subjection to the brine solution, as above described, maintained the fibrous part of the carrot intact and effectively prevented the cellular structure thereof from collapsing so that an extended period of storage did not result in any deterioration of such cellular structure. In other words, the brine solution, by use of a proportion of sucrose, not only somewhat sweetened the taste of the stated product, but performed the additional functions of a preservative during the storage period.

*Example IV*

Here fresh pears were subjected to the same vacuum treatment as that outlined with respect to Example I.

Because of the relatively impermeable skin of this fruit, the pears were first peeled and sliced prior to subjection to freezing temperature by means of submission to high vacuum.

In this instance, two syrups were used as the impregnating substances. One syrup consisted of a solution of calcium chloride and ascorbic acid and the other comprised a solution of calcium chloride and sulfur dioxide.

When admitted to the vacuum chamber, the pears were subjected to a relatively high vacuum of 150 microns mercury pressure (.15 mm. of mercury). After six minutes at this pressure the thermocouple reading indicated the temperature in the interior of the food product to be 28.5° F. The pressure within the chamber was raised to about 5000 micron mercury pressure (15.0 mm. of mercury).

The syrups were then admixed and poured over the pears when en vacua. The vacuum was then gradually released, and the chamber pressure increased to atmospheric, with this consequent increase in pressure forcing the additive in solution form through and into the interior of the pears.

The product was then promptly refrozen to a temperature of about −10° F. and maintained in frozen storage for a period of three months. Upon subjection to thawing temperatures, the treated product, as before, exhibited all of its original and natural characteristics including undamaged cellular structure, taste and appearance.

*Example V*

In this example, a comparison was made between a meat sample processed by the procedure of the instant invention and meat samples of like grade and cut not so treated. In each instance, the meat was frozen and then thawed prior to consumption so as to illustrate the striking advantages and improvement, insofar as taste, tenderness, preservation, etc., be concerned, resultant upon practice of the processes comprising this invention.

In choosing the three samples, the lowest and toughest grade of meat available was utilized. Three 3½ pound samples were cut from adjacent sections of a hind quarter of beef, utility grade, the lowest grade of meat available on the market. These samples were separate, seven-inch diameter cuts taken from the same position in the hind quarter and were trimmed in exactly the same manner.

Piece A was sharp frozen at −20° F. cabinet temperature.

Piece B was liberally sprinkled with an unseasoned meat tenderizer or enzymatic preparation upon each side and then punctured in numerous places with a fork. It was permitted to stand for thirty minutes and then sharp frozen in the same manner as piece A.

Piece C was subjected to the treatment of the instant invention. This piece was placed in a tray on glass rods in the vacuum chamber, the tray maintaining it above the bottom of the chamber. The vacuum induced in the chamber was determined to amount to a pressure of 3500 microns of mercury (3.5 mm. of mercury). After eight minutes, the interior temperature of the meat, through the usual thermocouple gauge instrument, was determined to be 33° F. At this point a 20% aqueous solution of the same enzymatic meat tenderizer which had been used with respect to piece B, and which solution was cooled to 34° F., was poured over the meat while in the vacuum chamber.

The pressure was then increased to normal as atmospheric and the meat, over a period of time of thirty minutes, was allowed to drip free of the tenderizer solution. This piece C was then sharp frozen for permanent storage.

The three specimens were removed from frozen storage at the same time and after a period of three months. All three, after thawing, were fried at 380° F. in vegetable shortening of ordinary type.

Piece A was so tough it could not be readily eaten.

Piece B, despite the use of a tenderizer, was very tough and unpalatable.

Piece C, subjected to the vacuum freezing and impregnation step of the instant invention, exhibited complete tenderness and was of excellent taste, despite the fact that this piece, like the others, was taken from an inferior grade and cut. The difference is attributable to the means whereby an enzymatic, tenderizing solution can be caused to thoroughly penetrate the entire mass of the food product. Penetration in the instant process is equal and uniform throughout the entire mass of the product due to the uniform, even and constant pressure exerted upon the entire surface thereof. Furthermore, penetration is to all practical purposes, almost instantaneous, and accomplished without damage to the internal cellular structure of the involved product.

*Example VI*

In this example, advantage is taken of the intermediate heating step.

Here fresh strawberries are prepared for admission to the vacuum chamber in the same manner as set forth with respect to Example I. After admission to the vacuum chamber, the pressure within the chamber will be determined to be approximately 260 microns of mercury (.26 mm. of mercury) and the temperature within the strawberries will read about −10° F.

At this time the pressure is returned to atmosphere and the strawberries are subjected to air at a temperature of about 140° F. for a period of about five minutes at which time the strawberries are raised to a temperature approximating room temperature. Such warm air has the effect of additionally dehydrating or removing an appreciable portion of fluid from the interior of the food product.

The pressure within the chamber is then reduced to about 260 microns (0.26 mm.) of mercury to refreeze the product. To accomplish impregnation, the pressure within the chamber is raised to about 4500 microns (4.5 mm. of mercury) to permit addition of the invert sugar solution referred to in Example I, the same being poured over the berries in the same manner.

The pump is then permitted to operate for an additional few minutes then turned off, and the chamber evacuated.

The excess sugar solution is strained from the berries and the latter refrozen by conventional means, as in Example I, and prepared for permanent frozen storage.

Upon removal of the berries from the storage after a period of approximately three months, it will be found that the same exhibit all of those qualities as outlined in Example I hereof.

In addition, appropriate determinations will demonstrate that the amount of dehydration of such berries will be increased from 2% to 5%, total amount of dehydration being from about 15% to 20%.

A primary concept of the instant invention involves the novel aspect of: quick freezing by means of relatively low pressure, taking advantage of the inherent rate of vaporization of the fluids or juices which constitute a substantial portion of the weight of any given fruit, vegetable or meat. Freezing is thus accomplished without application of exterior low temperature mechanisms of known type to obtain freezing temperatures. Freezing by subjection to high vacuum also enables, by its very nature, thorough penetration into the product of any given additive whether the latter be for the purpose of taste, preservation, tenderizing, etc. Processes of the prior art have inferred lowering of temperature by the use of relatively high vacuum; certain prior art processes have also employed various different methods intended to suitably impregnate a given food with certain additives. However, in the instant case the two steps are interdependent and correlated; simplified to the extreme, they diminish treatment time and since the only requirement is an effective and efficient vacuum mechanism, the elimination of other relatively complex low temperature equipment results in an overall low-cost operation.

In addition, the overall, basic process of the instant invention can be summarized as follows:

(a) Reducing the pressure in the vacuum chamber well below the boiling vapor pressure of the fluids contained in a given food product;

(b) Increase of pressure to a value slightly at about the vapor pressure of the impregnating solution at its boiling point in order that the latter may be admitted without substantial freezing;

(c) Introduction of the impregnating solution;

(d) Increase of chamber pressure to atmospheric whereby the impregnating solution is caused to penetrate into and throughout the product being processed;

(e) Final freezing by any conventional means or by the method of initial freezing here utilized: the reduction of pressure to a value which will freeze the product at temperatures suitable for permanent storage.

In addition, intermediate heating steps can be employed to further dehydrate the frozen product prior to final freezing, as described above.

Although it is obvious that the process comprising this invention may be varied in many ways and other expedients or alternates employed to accomplish the purposes thereof, it is to be understood that my invention is to be limited only by the scope of the following claims.

I claim:

1. A process for the freezing and impregnation by a pre-selected quality improving impregnating solution of a food product selected from the group consisting of fruits, vegetables and meats comprising: subjecting said product to a vacuum in the order of from about 0.15 mm. to about 4.5 mm. of mercury pressure in a vacuum zone to partially dehydrate the food product to not more than 20% moisture removal, said pressure in said zone maintaining the temperature of said food product at below about freezing and preventing cell rupture of said product during freezing thereof, releasing the vacuum in said zone, heating said product to about ambient temperature, refreezing said product by resubjection thereof to said vacuum, increasing the pressure in said zone to a value slightly above the vapor pressure of said impregnating solution at its freezing temperature, contacting said product with said quality improving impregnating solution, thereafter further increasing said pressure in said zone whereby said solution penetrates said product, and refreezing said product.

2. The process as defined in claim 1 wherein said product is a fruit and said additive comprises a solution of invert sugar.

3. The process as defined in claim 1 wherein said product is a vegetable and said additive comprises a brine solution of calcium chloride, citric acid and sucrose.

4. The process as defined in claim 1 wherein said product is a meat and said additive comprises an enzymatic, tenderizing solution.

5. A process for the freezing and impregnation, by a preselected quality improving impregnating solution, of a food product selected from the group consisting of fruits, vegetables and meats comprising: subjecting said product to a vacuum in the order of about 0.15 to about 4.5 millimeters of mercury in a vacuum zone to remove about 20 percent by weight of the moisture therefrom and freeze the same, admitting said impregnating solution to said zone when the pressure in said zone is raised to about the vapor pressure of said solution, contacting said product with said solution and raising the zone pressure so as to replace, with said impregnant, from between 25 to 50 percent by weight of the moisture removed by evaporation.

6. A process for freezing and impregnation by preselected quality improving impregnating solution of a food product selected from the group consisting of fruits, vegetables and meats comprising: placing a food product in a treating zone and subjecting said product to a vacuum of the order of 0.15 to about 4.5 millimeters of mercury to remove about 10 percent by weight of the moisture therefrom and freeze said products, releasing the vacuum and heating the frozen product to remove additional moisture, leaving the dehydrated food product with about 80% of the moisture originally present, lowering the chamber pressure to a value slightly below the vapor pressure of said impregnating solution and admitting said solution to said zone, contacting said product with said solution and raising the pressure in said zone so as to replace, with said impregnating solution, from between 25 to 50 percent by weight of the moisture removed by evaporation, and refreezing the impregnated food product by rapidly reducing the chamber pressure.

7. A process for the freezing and impregnation, by a preselected quality improving impregnating solution, of a food product selected from the group consisting of fruits, vegetables and meats comprising: subjecting said product to a vacuum in the order of 0.15 to 4.5 millimeters of mercury in a vacuum zone to remove between 10 to 20 percent by weight of the moisture content therefrom and freeze said product, releasing the vacuum and heating the frozen product to remove additional moisture, leaving the food with about 80% of the moisture originally present therein, refreezing said product by reducing the chamber pressure to about 0.15 to 4.5 millimeters of mercury raising said zone pressure and admitting said impregnating solution to said zone when the zone pressure is raised to slightly below the vapor pressure of said solution, contacting said product with said solution and raising the zone pressure so as to replace, with said impregnating solution, from between 25 to 50 percent by weight of the moisture removed by evaporation.

8. The process as defined in claim 5 wherein said product is a fruit and said additive comprises a solution of invert sugar.

9. The process as defined in claim 5 wherein said product is a vegetable and said additive comprises a brine solution of calcium chloride, citric acid and sucrose.

10. The process as defined in claim 5 wherein said product is a meat and said additive comprises an enzymatic tenderizing solution.

References Cited by the Examiner

UNITED STATES PATENTS

| | | | |
|---|---|---|---|
| 1,906,295 | 5/1933 | Wichenden | 99—102 |
| 2,278,472 | 4/1942 | Musher | 99—199 X |
| 2,292,447 | 8/1942 | Irwin | 99—199 X |
| 2,344,151 | 3/1944 | Kasser | 99—193 X |
| 2,400,748 | 5/1946 | Flosdorf | 99—199 |
| 2,419,877 | 4/1947 | Birdseye | 99—193 X |
| 2,473,184 | 6/1949 | Webb | 99—204 |
| 2,493,062 | 1/1950 | Flosdorf | 99—204 X |
| 2,785,075 | 3/1957 | Malecki | 99—192 |
| 2,788,281 | 4/1957 | Guadagni | 99—102 X |
| 2,899,319 | 8/1959 | Powers et al. | 99—204 |
| 3,010,831 | 11/1961 | Rivoche | 99—193 |

A. LOUIS MONACELL, *Primary Examiner.*

HYMAN LORD, *Examiner.*